Patented Sept. 19, 1950

2,523,127

UNITED STATES PATENT OFFICE 2,523,127

ANTIOXIDANT

Walter O. Lundberg, Austin, Minn., assignor to Regents of the University of Minnesota, Minneapolis, Minn., a corporation of Minnesota No Drawing. Application February 13, 1946, Serial No. 647,431

5 Claims. (Cl. 260—398.5)

The present invention relates to a process of stabilizing fatty products against the development of rancidity and also relates to the resultant product. The invention is particularly directed to the stabilization of animal fats, such as lard, and to products containing such fats.

The present invention involves a discovery that a synergistic antioxidant effect is produced by the use of a combination of antioxidants, one of which is selected from the group consisting of tocopherols, hydroquinone and nordihydroguaiaretic acid, and the other of which is selected from the group of amino acids consisting of methionine, threonine, leucine, norvaline, phenylalanine, cysteine, tryptophane, isoleucine, proline, alanine, glutamic acid, valine, asparagin, arginine, norleucine.

It is therefore a primary object of the present invention to provide a novel process of stabilizing fatty materials against oxidation and the development of rancidity by means of the use of the combination of phenolic antioxidant and an amino acid. It is a further object of the present invention to provide a novel stabilized fatty product containing synergistic antioxidants, one of which is a phenolic antioxidant and the other an amino acid. These and other objects of the invention will be more fully apparent from the following description of the invention.

As was pointed out above, it has been discovered that a synergistic antioxidant effect can be obtained by the simultaneous use of a phenolic antioxidant such as the tocopherols, hydroquinone and nordihydroguaiaretic acid and an amino acid selected from the group set forth above. By means of the use of such combinations of antioxidants it is possible to obtain stabilities representing synergistic indexes as high as 2 to 2½.

In carrying out the invention the antioxidants are merely incorporated into the fat substrate and are intimately mixed. In most instances concentration of about 0.01% of the antioxidant, based on the weight of the substrate, is sufficient to produce a product of commercially acceptable stability. It will be apparent that higher concentrations, up to and exceeding 0.1% to 1.0% of the antioxidants can be employed to obtain greater stabilities. The phenolic antioxidants appear to be soluble in the fat substrate at all the concentrations employed, whereas most of the amino acids dissolve to some slight extent, but in most cases the solubility is so low that at concentrations of 0.01% some of the amino acid remains undissolved. It is probable that the dissolved portion of the amino acid, even though it be very small in amount, is largely or primarily responsible for the synergistic effect, although it is possible that the undissolved portion (where some is undissolved) is also partly responsible. Whether or not the amino acid is dissolved or undissolved does not apparently affect its ability to stabilize the substrate.

The induction periods in the examples given were obtained by an active oxygen method at 98.6° C. (King, A. E., Roschen, H. L., and Irwin, W. H., Oil and Soap 10, 105 (1933)). In conformity with common practice, when measuring the stability of lard by this method, the end of the induction period was taken to be the time at which the accumulation of peroxides reaches 20 milli-equivalents per kilogram of fat. The substrates employed in the various examples are not necessarily from the same batch and accordingly there may be some variation in the stability given for the untreated substrate.

Example I

The synergistic effect of the use of the combination of threonine and alpha tocopherol is demonstrated by the following table:

| | Sample | Stability in Hours |
|---|---|---|
| 1 | Rendered lard | 11 |
| 2 | (1) plus 0.01% threonine | 17 |
| 3 | (1) plus .01% alpha tocopherol | 33 |
| 4 | (2) plus .01% alpha tocopherol | 67 |

Example II

The synergistic effect of the use of the combination of methionine and hydroquinone is demonstrated by the following table:

| | Sample | Stability in Hours |
|---|---|---|
| 1 | Rendered lard | 5 |
| 2 | (1) plus .01% methionine | 37 |
| 3 | (1) plus .01% hydroquinone | 44 |
| 4 | (2) plus .01% hydroquinone | 142 |

Example III

The synergistic effect of the use of the combination of methionine and nordihydroguaiaretic acid is demonstrated by the following table:

| | Sample | Stability in Hours |
|---|---|---|
| 1 | Rendered lard | 5 |
| 2 | (1) plus .01% methionine | 37 |
| 3 | (1) plus .01% nordihydroguaiaretic acid | 143 |
| 4 | (2) plus .01% nordihydroguaiaretic acid | 336 |

Likewise synergistic effects are noted when any of the amino acids contained in the following table is employed in combination with tocopherol, hyroquinone or nordihydroguaiaretic acid:

Methionine
Threonine
Leucine
Norvaline
Phenylalanine
Cysteine
Tryptophane
Isoleucine
Proline
Alanine
Glutamic acid
Valine
Asparagin
Arginine
Norleucine It is preferred to employ the amino acids in a relatively pure and isolated condition as it is simple to determine the amount of amino acid thus added. It is also possible, however, to use relatively impure protein hydrolysates containing any of the above amino acids or any combination thereof. The determination of the amount of any amino acid may be somewhat difficult and the amount added may be more difficult to control. However, where it is not necessary to control accurately the amount of amino acid, protein hydrolysates lend themselves satisfactorily as a source of amino acid.

While various modifications of the invention have been described, it will be apparent other modifications may be made without distinguishing from the spirit of the invention. Thus, as has been pointed out previously, concentrations of the antioxidants may be varied considerably, but it has been found that concentrations within the range of .01 to .1% produce products of commercially satisfactory stability. It will be appreciated that higher stabilities may be obtained at a somewhat increased cost by the employment of higher concentrations of the antioxidants.

Similarly there are numerous modifications possible in the substrate and in the method of introducing the antioxidants. Such modifications will be apparent to those skilled in the art from the above disclosure and accordingly the invention is not to be limited except by the following claims.

What I claim is:

1. A composition of matter comprising an animal fat, said fat being stabilized by a phenolic antioxidant selected from the group consisting of tocopherols, hydroquinone and nordihydroguaiaretic acid and an amino acid selected from the group consisting of Methionine
Threonine
Leucine
Norvaline
Phenylalanine
Cysteine
Tryptophane
Isoleucine
Proline
Alanine
Glutamic acid
Valine
Asparagin
Arginine
Norleucine and mixtures thereof, the phenolic antioxidant and the total amino acid present each being in a concentration within the range of from 0.01% to 1.0%, by weight, of the fat.

2. A composition of matter as set forth in claim 1 characterized in that the phenolic antioxidant and the total amino acid present each is in a concentration within the range of from 0.01% to 0.1%, by weight, of the fat.

3. A composition of matter as set forth in claim 1 characterized in that the phenolic antioxidant is a tocopherol and the amount of tocopherol and the total amino acid present each is 0.01%, by weight, of the fat.

4. A composition of matter as set forth in claim 1 characterized in that the phenolic antioxidant is a hydroquinone and the amount of hydroquinone and the total amino acid present each is 0.01%, by weight, of the fat.

5. A composition of matter as set forth in claim 1 characterized in that the phenolic antioxidant is nordihydroguaiaretic acid and the amount of nordihydroguaiaretic acid and the total amino acid present each is 0.01%, by weight, of the fat.

WALTER O. LUNDBERG.

REFERENCES CITED

The following references are of record in the file of this patent:

UNITED STATES PATENTS

| Number | Name | Date |
|---|---|---|
| 2,223,244 | Bohm et al. | Nov. 26, 1940 |
| 2,373,192 | Lauer | Apr. 10, 1945 |

OTHER REFERENCES

Mattil et al., Oil and Soap, June 1944, pp. 160–161.

Oil and Soap, Riemerschneider et al., October 1944, pages 307–309.